UNITED STATES PATENT OFFICE.

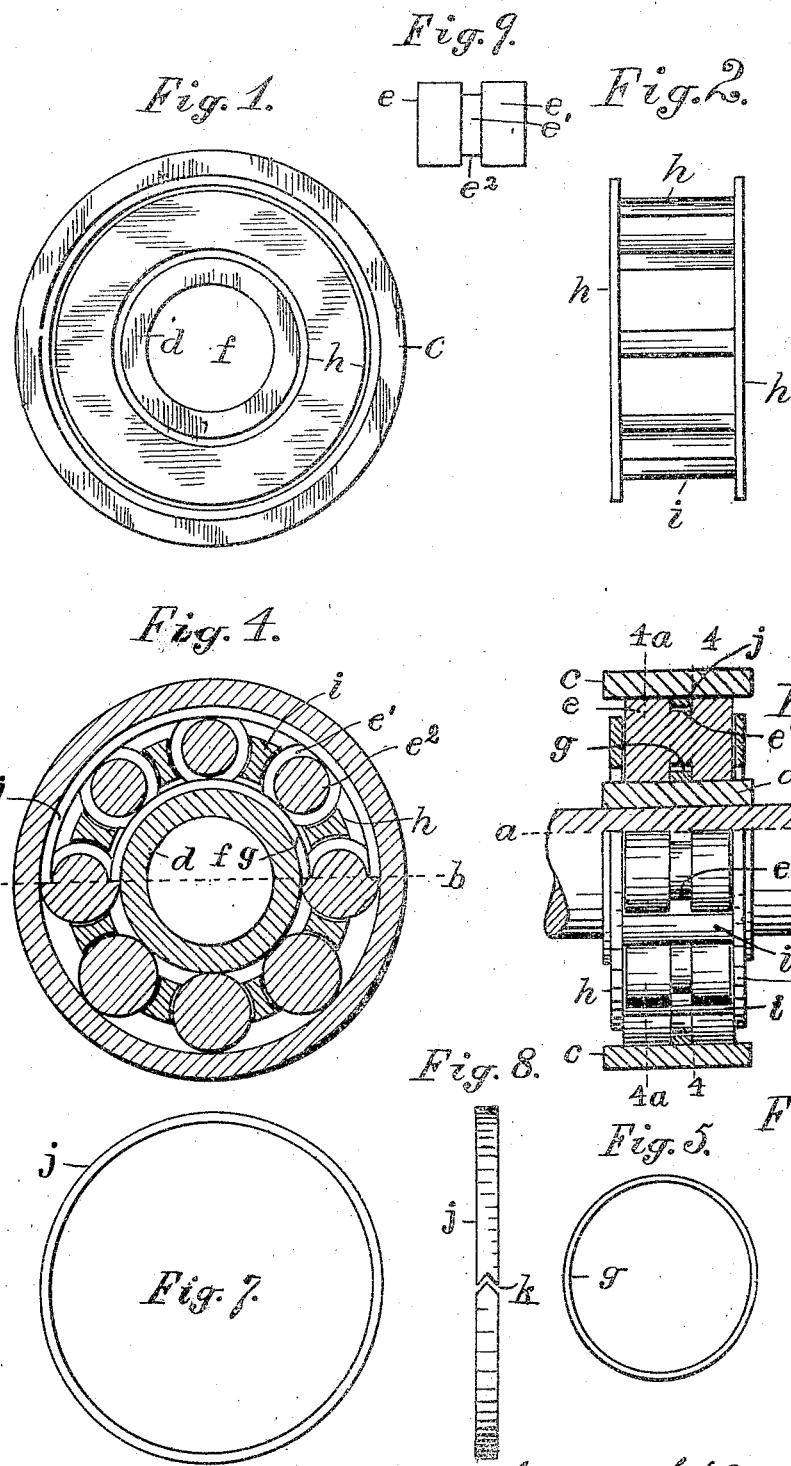

CHARLES S. LOCKWOOD, OF NEWARK, NEW JERSEY, ASSIGNOR TO HYATT ROLLER BEARING DIVISION, UNITED MOTORS CORPORATION, OF HARRISON, NEW JERSEY, A CORPORATION OF NEW YORK.

ROLLER-BEARING WITH REGULATOR-COLLAR.

1,324,833.   Specification of Letters Patent.   Patented Dec. 16, 1919.

Application filed December 2, 1918. Serial No. 264,918.

*To all whom it may concern:*

Be it known that I, CHARLES S. LOCKWOOD, a citizen of the United States, residing at 496 Clinton avenue, Newark, county of Essex, and State of New Jersey, have invented certain new and useful Improvements in Roller-Bearings with Regulator-Collars, fully described and represented in the following specification and the accompanying drawings, forming a part of the same.

The present invention relates to a roller bearing in which the hub and casing are provided with opposed cylindrical seats to which the rolls are fitted and upon which they are capable of sliding longitudinally; and the object of the invention is to restrain and prevent the shifting of the rolls longitudinally upon the hub, without forming the hub or casing with any integral projecting shoulder to engage the ends of the rolls.

As a substitute for such projecting shoulder, the hub of the casing in the present invention is provided with a so-called regulator collar which is fitted snugly to the hub so as to be retained in any adjusted position thereon by friction, and the rolls intermediate to their ends are provided each with a groove adapted to embrace the edges of the collar and be held thereby from end-motion.

With such construction the rolls are held between the hub and casing by the frictional engagement of the regulator collar but can be pushed endwise of the hub and casing when required to inspect the rolls or to replace any injured rolls with new ones. Such replacement is readily effected and the set of rolls can then, with its regulator collar, be pushed endwise of the hub to its working position.

The bearing is not intended to resist end-thrust, and any push upon the regulator collar from either side, independent of end thrust, has only a nominal force as it arises solely from a slight tendency of any roll to move endwise, owing to the variability of the size and shape of the parts, or owing to any "canting" or tipping of the shaft and casing in relation to one another when the bearing is in use.

End-movement of any roll in the bearing while the cage is held in a definite position by the remaining rolls would produce a rubbing of the roll-ends against the head of the cage and develop a frictional resistance to the movement of the rolls, and this is avoided by the present invention.

The invention will be understood by reference to the annexed drawing, in which Figure 1 is an end-view of the bearing ready for application to a shaft; Fig. 2 is an edge-view of the cage; Fig. 3 is an edge-view of the bearing upon a shaft with the parts in vertical section above the line $a$—$a$. Only the casing and retaining-ring are shown in section below the line $a$—$a$. Fig. 4, above the line $b$—$b$, is a section on line 4—4 in in Fig. 3, and below the line $b$—$b$ in section on the line $4^a$—$4^a$; Fig. 5 is an end-view, and Fig. 6 an edge-view of the regulator collar. Fig. 7 is an end-view, and Fig. 8 a side-view of the retaining-ring for the rolls. Fig. 9 is a side elevation of one of the rolls.

The parts of this construction are wholly of cylindrical form and thus made very cheaply and rapidly by automatic lathes; the casing being a straight cylindrical shell $c$ and the hub a straight cylindrical shell $d$ with bore $f$ is adapted to fit a shaft $f'$. (See Fig. 3.)

The rolls have a cylindrical body $e$ at each end with groove $e'$ of rectangular cross section between the same forming a neck $e^2$. Midway upon the length of the hub the regulator collar $g$ is shown of cross section similar to that of the groove $e$ which is fitted thereto so as to turn easily as the rolls move about the hub.

The cage is shown with heads $h$ and integral spacing-bars $i$ to form sockets adapted to admit upon their outer sides the bodies of the rolls. A split ring $j$ of the same cross section as the regulator collar is fitted to the groove at the outer side of each roll, embracing all of their necks, as shown in the upper part of Fig. 4, so as to retain them when assembled upon the hub.

The division $k$ in this retaining-ring permits it to be opened to slide over the bodies of the rolls from either end to slip it into the grooves $e^2$ when the rolls are assembled in the cage.

Inspection of Fig. 3 shows that when the rolls are thus assembled the regulator collar is embraced by the grooves upon the inner sides of all the rolls, and neither the rolls nor the collar can be applied to the hub independently.

The assemblage of the rolls in the cage, with the collar and split ring, forms a unitary group which is capable of sliding endwise over the hub to set it in its working position, and the regulator collar is fitted to the hub with sufficient snugness to retain its place by friction in the ordinary operation of the bearings.

It will be observed that the parts are all of cylindrical form and can thus be readily made by turret-lathes, and can be readily assembled and the rolls inserted between the hub and casing. As the collar $g$ is held in place by friction only, it can be withdrawn from the casing at any time for examination, cleaning, repairs, or replacement without the necessity of unlocking any fastening.

The rolls are all independent of one another, and when any of the rolls is injured the set of rolls can be readily disengaged from the hub and casing; the retaining-ring removed and any or all of the rolls taken from the cage and others substituted.

By making the retaining-ring a little larger than the bore of the casing, it can be compressed at the division $k$ to insert it in the casing, and is then held by the friction due to its expansive force in any position where it is located. This ring also operates to hold the rolls in the cage to facilitate handling when the cage is removed from the casing.

It will be understood that the annular roll-space between the hub and casing is made of the same dimensions at both ends of the bearing, so that the rolls may be pushed into such roll-space from the end of the casing.

In such movement of the rolls and cage the regulator collar and the retaining-ring offer only a frictional resistance and can thus be pushed to their working position in which such resistance operates usefully and effectively to keep the rolls from shifting toward the heads of the casing and generating friction thereat.

I am aware that a set of rolls having a groove at the middle of their length have been used in a roller-bearing in connection with annular ribs or collars removable from the bearing but provided with locking devices which are necessary to secure them in an operative position and which require release before the rolls can be removed for inspection.

I wholly disclaim any means for locking a guide-collar or ring upon a hub or casing, as my invention is designed especially to simplify the construction and operation of the bearing; and to avoid the expense of providing locking means, and the delay of disengaging them when the rolls require inspection.

Having thus set forth the nature of the invention what is claimed herein is:

In a roller bearing, the combination, with the hub having a continuous cylindrical seat for the rolls, of a regulator collar fitted snugly and removably upon the said hub and retained thereon by friction only, a set of rolls fitted to the hub having each a groove embracing the edges of the collar, a casing fitted to the outer sides of the rolls, and a cage inclosed wholly within the casing, having heads connected by spacing-bars intermediate the rolls, and the spacing-bars located to clear the regulator collar.

In testimony whereof I have hereunto set my hand.

CHARLES S. LOCKWOOD.